Feb. 19, 1957     T. R. BOYD     2,781,686
RESILIENT SHEET METAL FASTENER HAVING
STUD BITING APERTURE THEREIN
Filed Feb. 1, 1954
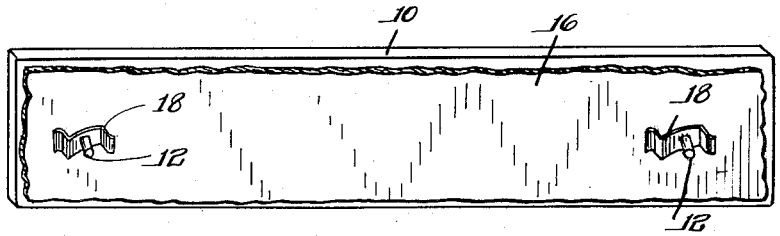
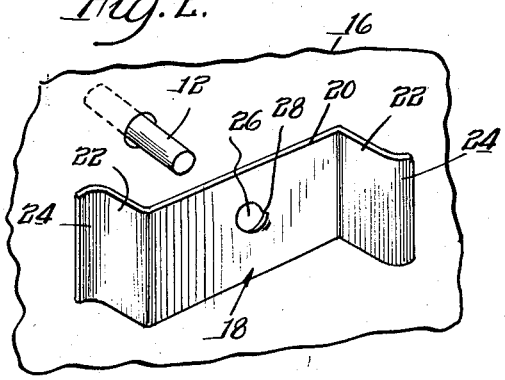
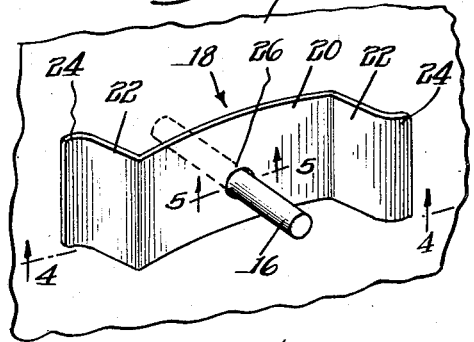
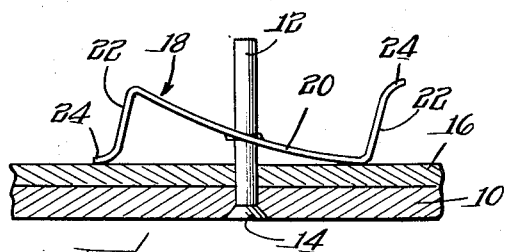
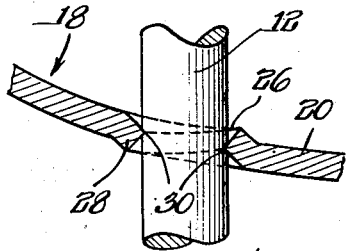
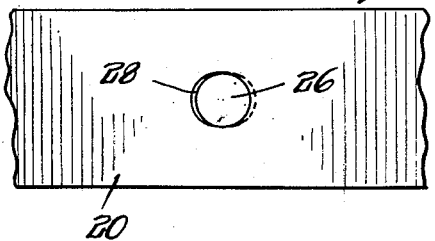
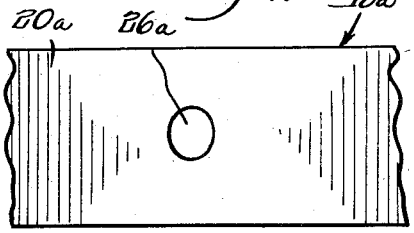
INVENTOR.
Thomas R. Boyd
BY
Olson & Trexler
Attys

United States Patent Office 2,781,686
Patented Feb. 19, 1957

2,781,686

RESILIENT SHEET METAL FASTENER HAVING STUD BITING APERTURE THEREIN

Thomas R. Boyd, Chicago, Ill., assignor to Illinois Tool Works, Chicago, Ill., a corporation of Illinois Application February 1, 1954, Serial No. 407,463

4 Claims. (Cl. 85—36)

This invention is concerned generally with a fastener, and more particularly with a sheet metal fastener for association with a stud fastener.

In many instances in which great forces need not be resisted sheet metal nuts have been proven to be fully as satisfactory as solid nuts. In addition, sheet metal nuts are easy to handle and to install, and are less expensive to produce than conventional solid nuts. Such sheet metal nuts heretofore have been restricted to use with threaded stud fasteners. Accordingly, it has been necessary to thread these studs into the sheet metal nuts, thus taking up a significant amount of time, and it further has been necessary to utilize threaded studs, which of course are more expensive and time consuming to produce than are plain cylindrical studs. This invention is concerned specifically with metal fasteners more or less analogous to sheet metal nuts.

It is an object of this invention to provide a fastener for association with an unthreaded stud wherein the fastener and stud may be quickly and simply assembled by a simple relative axial movement, followed by relative rotative movement to tighten the parts in holding position.

It is a further object of this invention to provide a sheet metal fastener having a helical impression therein adapted to cut its own threads in an unthreaded stud fastener.

A further object of this invention is to provide a sheet metal fastener having an improved flexing action when abutting a work piece for retaining a stud fastener with axial tension thereon.

Yet another object of this invention is to provide a sheet metal fastener for association with studs which is safer and easier for an operator to handle than previous fasteners have been.

Still another object of this invention is to provide a substantially wasteless sheet metal fastener.

In accordance with the foregoing, this invention contemplates the provision of a one piece sheet metal fastener. This fastener is provided with a diagonal strut member having a central aperture which preferably is provided with a helical impression for forming its own threads on a smooth stud fastener after the sheet metal fastener and the stud have been assembled by a simple relative axial motion. The diagonal strut is sufficiently resilient to provide a certain amount of tension on the stud with which it is assembled, and a further, resilient foot portion is provided for augmenting the spring tension on the stud. Furthermore, the sheet metal fastener is so constructed that it can be installed in either direction with a stud.

Other advantages and objects of the present invention will be apparent from the following description when taken in connection with the accompanying drawings wherein:

Fig. 1 is a rear perspective view showing a plate or the like mounted on a panel by means of my fasteners;

Fig. 2 is an enlarged perspective view showing a fastener about to be associated with a stud;

Fig. 3 is a view similar to Fig. 2 and showing the fastener associated with the stud;

Fig. 4 is a longitudinal sectional view taken along the line 4—4 of Fig. 3;

Fig. 5 is a longitudinal sectional view on an enlarged scale taken along the line 5—5 of Fig. 3;

Fig. 6 is a plan view of a portion of the fastener; and

Fig. 7 is a similar plan view showing a modified form of the invention.

Referring now in greater particularity to the figures, wherein similar numerals are utilized to identify similar parts throughout, there will be seen in Fig. 1 a plate 10, which for purposes of illustration may be considered to be a name plate, although it will be understood that this could be a part number plate, an escutcheon, or any other article presenting a low tension load. Studs 12 (see also Fig. 4) project through the plate 10 and may be countersunk therein, having bevelled heads 14 for this purpose. The studs 12 preferably are rotatable in the plate 10 rather than being affixed thereto, and the stud heads 14 preferably are provided with some driving means such as a screw driver slot for rotating each stud.

The studs project through suitable apertures in the panel 16 upon which the name plate 10 is to be mounted. The studs are held in fully inserted position by the sheet metal fasteners 18 which form the subject matter of my invention.

Each sheet metal fastener 18 is substantially Z-shaped in configuration, having an intermediate web or strut portion 20. The web or strut 20 is provided at its opposite end with flanges 22 of the same width as the strut and at substantially right angles thereto, the two flanges 22 extending generally opposite to one another. Each flange 22 is provided with an outwardly deflected end or edge portion 24. It will be apparent that this integral, one piece fastener is readily stamped from a rectangular blank with substantially no wastage.

The web or strut 20 further is provided with a central aperture 26, and this aperture is provided with a helical impression 28 about its edges. In assembling the sheet metal fastener 18 with the stud 12, the stud and fastener are simply moved axially into association as far as possible, the strut 20 preferably being deflected slightly by the fingers to provide some tension upon the stud. The fastener in its preferred form is made of hardened steel, and accordingly the edge of the aperture 26 bites into the stud 12 as will be seen at 30 in Fig. 5. Rotation of the stud 12 then causes the helical impression 28 to form threads from the indentations 30 in the shank 12 whereby greater spring tension is applied to the stud and the parts are held more firmly together. It will be appreciated that the strut 20 deflects somewhat, and that the outwardly bent end portions 24 on the flanges 22 also deflect, thus supplying sufficient spring tension on the stud to prevent accidental loosening thereof, and to prevent any looseness between the parts held by the stud and fastener.

A modified form of the invention is shown in Fig. 7 wherein only the strut 20a of the modified fastener 18a as shown. The strut 20a is provided with a central aperture 26a which has no helical impression. Instead, the aperture 26a is roughly elliptical, having its major dimension arranged transversely of the strut and having its minor dimension arranged longitudinally thereof. This arrangement of the major and minor dimensions or axes of the elliptical opening 26a insures aggressive biting of the edges into a stud due to the limited contacting area presented. It will be apparent that the modification shown in Fig. 7 would not be effective to cut its own threads as is the case with the preferred embodiment, although considerable spring tension can be applied manually by flexing the strut 20 with the fingers when the fastener is of the proper dimensions. It will be understood that a threaded fastener could be utilized with either of the embodiments illustrated, in which case the threaded or stud fastener would have to be threaded into my sheet metal fastener.

From the foregoing description it will be apparent that the improved sheet metal fastener herein disclosed and claimed is capable of firmly and tightly holding a stud when relatively light loads or tensions are encountered. The spring tension applied to the stud by my fastener insures that the stud cannot come loose accidentally and holds the parts mounted by the stud and fastener tightly together so that they cannot rattle. In the preferred form of the invention, with the helical impression, the fastener can be assembled very quickly with a stud by a relative axial movement of the stud and fastener. A subsequent relative rotary motion imparted to the stud and fastener will cause the fastener to cut threads on the stud to draw the same up tightly.

The outwardly turned edges or lip portions on the flanges on either end of the fastener facilitate flexing of the fastener when it abuts a work piece. These outwardly turned portions flex somewhat themselves, and tend to bend the flanges outwardly a bit, away from the strut 20, so that the spring tension is applied by the flanges and the outwardly projecting portions as well as by the strut itself. The outwardly turned flanges also remove the relatively sharp, stamped edges from a position where they might readily cut an operator's hand in applying the fastener if the outwardly turned portions merely had formed planar continuations of the flanges.

It will be apparent that the specific illustrative examples herein shown and described have been set forth to explain the invention, and do not form a limitation thereon. It further will be understood that the invention contemplates all that falls within the spirit and scope of the appended claims.

The invention is claimed as follows:

1. A resilient sheet metal fastener for use with a threadless stud, and comprising a substantially rectangular body portion which is normally planar but which is flexible along the longitudinal axis of the body portion, flanges extending in opposite directions from opposite ends of said body portion, each of said flanges having an outwardly turned free end, said body portion having an aperture therethrough with at least opposed edges being deformed from the median plane of the body portion in opposite directions with each said edge extending transversely of the longitudinal axis of the body portion and the deformation of each edge being in the same direction as the flange nearest thereto to present sharp stud-engaging lips of sufficient hardness to bite into an associated threadless stud to form threads thereon, one of said flanges and the opposite end of the body portion contacting a workpiece to resiliently position the body obliquely to the axis of the associated stud, said workpiece contacting flange being sufficiently flexible to shift outwardly upon imposition of a force to the body portion along the axis of the associated stud whereby the body portion, when positioned against the workpiece, assumes a concave deformation for aggressively urging the stud-engaging lips into biting contact with the stud.

2. A resilient sheet metal fastener as claimed in claim 1, wherein the aperture through the body portion is defined by a continuous uninterrupted curved edge.

3. A resilient sheet metal fastener as claimed in claim 1, wherein the said aperture is initially circular with the deformed material providing a substantially continuous helical formation impressed on the edge thereof to provide the stud-engaging lip.

4. A resilient sheet metal fastener as claimed in claim 1, wherein the deformed opposed edges of the aperture are disposed substantially along the median plane of the body portion.

References Cited in the file of this patent

UNITED STATES PATENTS

| 1,619,589 | Steenrod | Mar. 1, 1927 |
| 2,326,261 | Shippee et al. | Aug. 10, 1943 |
| 2,382,936 | Bedford | Aug. 14, 1945 |
| 2,393,030 | Eggert | Jan. 15, 1946 |
| 2,502,539 | Tinnerman | Apr. 4, 1950 |
| 2,572,588 | Bedford | Oct. 23, 1951 |
| 2,645,264 | Rosenberg | July 14, 1953 |

FOREIGN PATENTS

| 860,791 | France | Oct. 7, 1940 |